(12) United States Patent
Fan et al.

(10) Patent No.: US 8,965,093 B2
(45) Date of Patent: Feb. 24, 2015

(54) METHOD FOR REGISTERING FUNCTIONAL MRI DATA

(75) Inventors: Yong Fan, Beijing (CN); Di Jiang, Beijing (CN); Tianzi Jiang, Beijing (CN)

(73) Assignee: Institute of Automation, Chinese Academy of Sciences, Beijing (CN)

( * ) Notice: Subject to any disclaimer, the term of this patent is extended or adjusted under 35 U.S.C. 154(b) by 137 days.

(21) Appl. No.: 13/806,509

(22) PCT Filed: Dec. 21, 2011

(86) PCT No.: PCT/CN2011/084310
§ 371 (c)(1),
(2), (4) Date: Jan. 28, 2013

(87) PCT Pub. No.: WO2013/091181
PCT Pub. Date: Jun. 27, 2013

(65) Prior Publication Data
US 2013/0177228 A1 Jul. 11, 2013

(51) Int. Cl.
*G06T 7/00* (2006.01)
(52) U.S. Cl.
CPC .......... *G06T 7/0012* (2013.01); *G06T 7/0028* (2013.01); *G06T 2200/04* (2013.01); *G06T 2207/10088* (2013.01); *G06T 2207/30016* (2013.01)
USPC .......................................... 382/131; 382/294
(58) Field of Classification Search
None
See application file for complete search history.

(56) References Cited

U.S. PATENT DOCUMENTS

2014/0079338 A1* 3/2014 Siewerdsen et al. .......... 382/284

FOREIGN PATENT DOCUMENTS

CN 1627095 A 6/2005
CN 1883386 A 12/2006
(Continued)

OTHER PUBLICATIONS

Wu et al. "Improvement to functional Magnetic Resonance Imaging (fMRI) Methods using Non-rigid Body Image Registration Methods for Correction in the Presence of Susceptibility Artifact Effects." 28th Annual International Conference of the IEEE Enginering in Medicine and Biology Society, Aug. 30, 2006, pp. 1018-1020.*
(Continued)

*Primary Examiner* — Jon Chang
(74) *Attorney, Agent, or Firm* — Westman, Champlin & Koehler, P.A.

(57) ABSTRACT

A method for registering functional MRI data, comprising: computing the functional connectivity pattern for every voxel in its given spatial neighborhood for every fMRI image; extracting features invariant to spatial location of the neighboring voxels based on the functional connectivity patterns; constructing similarity metric between voxels of different images based on the extracted features, and using fluid-like demons registration model to spatial normalize the fMRI data. The present invention tries to exploit the multi-range functional connectivity information of the fMRI data, and to register functional MR images based on the extracted spatial-location-invariant features. The present invention is robust against local spatial perturbations and does not depend on the assumption that functional signals of different subjects are synchronic, hence can be applied to resting-state fMRI data, and can achieve a statistically significant improvement in functional consistency across subjects.

8 Claims, 5 Drawing Sheets

(56) References Cited

FOREIGN PATENT DOCUMENTS

| CN | 101297321 A | 10/2008 |
|---|---|---|
| CN | 101666865 A | 3/2010 |
| WO | 2009/002072 A2 | 12/2008 |

OTHER PUBLICATIONS

Cahill et al. "Demons Algorithms for Fluid and Curvature Registration." IEEE International Symposium on Biomedical Imaging: From Nano to Macro, Jun. 28, 2009, pp. 730-733.*

Bryan R. Conroy et al., "fMRI-Based Inter-Subject Cortical Alignment Using Functional Connectivity", work funded by a grant from the National Institute of Mental Health (5R01MH075706-02), 9 pages, 2009.

Sabuncu et al., "Function-based intersubject Alignment of Human Cortical Anatomy", Cerebral Cortex Jan. 2010; 20:130-140, doi: 10.1093/cercor/bhp085, Advance Access publication May 6, 2009, 11 pages.

Copy of International Search Report and Written Opinion (in Chinese) for PCT Application No. PCT/CN2011/084310, dated Jul. 5, 2012, 9 pages.

* cited by examiner

302

304

306

308

METHOD FOR REGISTERING FUNCTIONAL MRI DATA

CROSS-REFERENCE TO RELATED APPLICATION

This Application is a Section 371 National Stage Application of International Application No. PCT/CN2011/084310, filed Dec. 21, 2011, in Chinese, the contents of which are hereby incorporated by reference in their entirety.

FIELD OF THE INVENTION

The present invention generally relates to medical image processing, particularly to register functional MRI data.

BACKGROUND

For most brain analysis studies based on fMRI data, inter-subject spatial alignment of fMRI data is a necessary precursor, and a better inter-subject spatial correspondence often leads to improved statistical analysis results with enhanced statistical significance. Inter-subject spatial alignment of fMRI data is typically achieved through registering their co-registered structural MRI images due to their relatively high spatial resolution and good image texture information. However, a good alignment of brain anatomical structures across different subjects does not necessarily lead to good inter-subject functional consistency in that functional units are not necessarily located relative to anatomical structures consistently due to functional variability across subjects. In order to improve the functional consistency across subjects, spatial smoothing of the functional image of each subject is commonly applied in practice after the structural MRI image based registration. However, the adverse effects of image smoothing, including functional signal blurring and loss of fine-grained information, will be brought into the subsequent group analysis. Hence, it is desired to develop an image registration method capable of achieving better functional consistency across subjects in fMRI studies.

Recently, several functional information based image registration methods have been proposed for achieving better consistency of brain functions across subjects. A cortical surface alignment method was proposed to maximize similarity of functional signals between subjects in Sabuncu et al, "Function-based intersubject alignment of human cortical anatomy", Cerebral Cortex 20 (2010), pgs. 130-140. In this method, the Pearson correlations between inter-subject functional signals were maximized to register different subjects' cortex surface meshes based upon an assumption that functional signals are synchronic across different subjects. However, such an assumption is not necessarily true in most cases. In resting-state fMRI (rs-fMRI) images, for instance, even at the same position of same subject, no significant correlations exist between the functional signals scanned at different time. Thus, such a method is not reliable for rs-fMRI images. To overcome this drawback, methods have been proposed to achieve functional image registration by maximizing similarity of functional connectivity patterns at the same spatial locations between different subjects, i.e., using functional connectivity measures as features to drive the image registration. In the method proposed in Conroy et al, "fMRI-Based Inter-Subject Cortical Alignment Using Functional Connectivity", Advances in Neural Information Processing Systems (2009), pgs. 378-386, the whole-brain functional connectivity matrix was used as a descriptor of functional information on the cortical surface and cortical surface meshes of different subjects were registered by minimizing the Frobenius norm of difference of their functional connectivity matrices. However, the global functional connectivity pattern based functional image registration is not robust since the global functional connectivity patterns are sensitive to local perturbations. A small spatial rotation or shift of functional units may alter the global functional connectivity patterns dramatically, thus leads to misregistration. In addition, the dimension of the global connectivity matrix is often too large for the subsequent processing. In Langs et. al, "Functional Geometry Alignment and Localization of Brain Area", Advances in Neural Information Processing Systems (2010), pgs. 1225-1133, features were first extracted from the whole-brain functional connectivity matrix using a spectral embedding technique, functional images were then aligned by a point set registration method in the feature space, and finally the transformation information was mapped back to the original fMRI image space for achieving image registration. A problem of the spectral embedding based feature extraction is that ad hoc techniques have to be utilized to make the extracted features of different subjects comparable since embedding is defined up to rotation, order, and sign of individual coordinate axes.

SUMMARY OF THE INVENTION

The subject of the invention is to provide a method for registering functional MR images automatically.

A method for registering functional MRI data, comprising:
  computing the functional connectivity pattern for every voxel in its given spatial neighborhood for every fMRI image;
  extracting features invariant to spatial location of the neighboring voxels based on the functional connectivity patterns;
  constructing similarity metric between voxels of different images based on the extracted features, and using fluid-like demons registration model to spatial normalize the fMRI data.

The present invention tries to exploit the multi-range functional connectivity information of the fMRI data, and to register functional MR images based on the extracted spatial-location-invariant features. The present invention is robust against local spatial perturbations and does not depend on the assumption that functional signals of different subjects are synchronic, hence can be applied to resting-state fMRI data, and can achieve a statistically significant improvement in functional consistency across subjects.

DETAILED DESCRIPTION OF EXEMPLARY EMBODIMENTS

The present invention is directed to a method for automatic registration of functional MR images. Embodiments of the present invention are described herein to give a demonstration of this functional MR image registration method.

Figure 1:
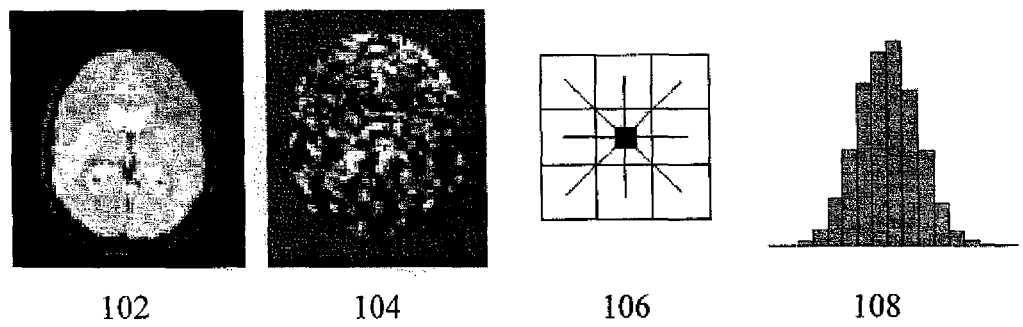
FIG. 1 illustrates exemplary functional MR images before and after the preprocessing, and also the schematic diagram of the local functional connectivity pattern in a given spatial neighborhood and the feature extraction strategy.

As the illustration of FIG. 1, image 102, 104 shows an axial slice of a functional MR image before and after the preprocessing step respectively. In particular, image 102 shows the original functional MR image, and image 104 shows the output functional MR image of the preprocessing step. FIG. 106 shows the schematic illustration of computing the local functional connectivity pattern in a spatial neighborhood, in particular, computing the Pearson correlations between the given voxel (central black point) and its neighboring voxels (colored points). FIG. 108 schematically shows the extracted feature, i.e. a probability distribution.

Embodiments of the present invention provide a registration method based on optimizing the similarity of functional connectivity patterns across subject. Features invariant to spatial location of the neighboring voxels are extracted from functional connectivity patterns. Euclidian distance is used as the similarity measure between images and the objective function is constructed based on this similarity measure, by minimizing the objective function, the moving image is warped into the target image space, and Fluid-like Demons model is utilized to regularize the deformation fields. The multi-range image registration is achieved by gradually increasing the neighborhood size to capture the functional connectivity patterns in larger spatial range.

Figure 2:
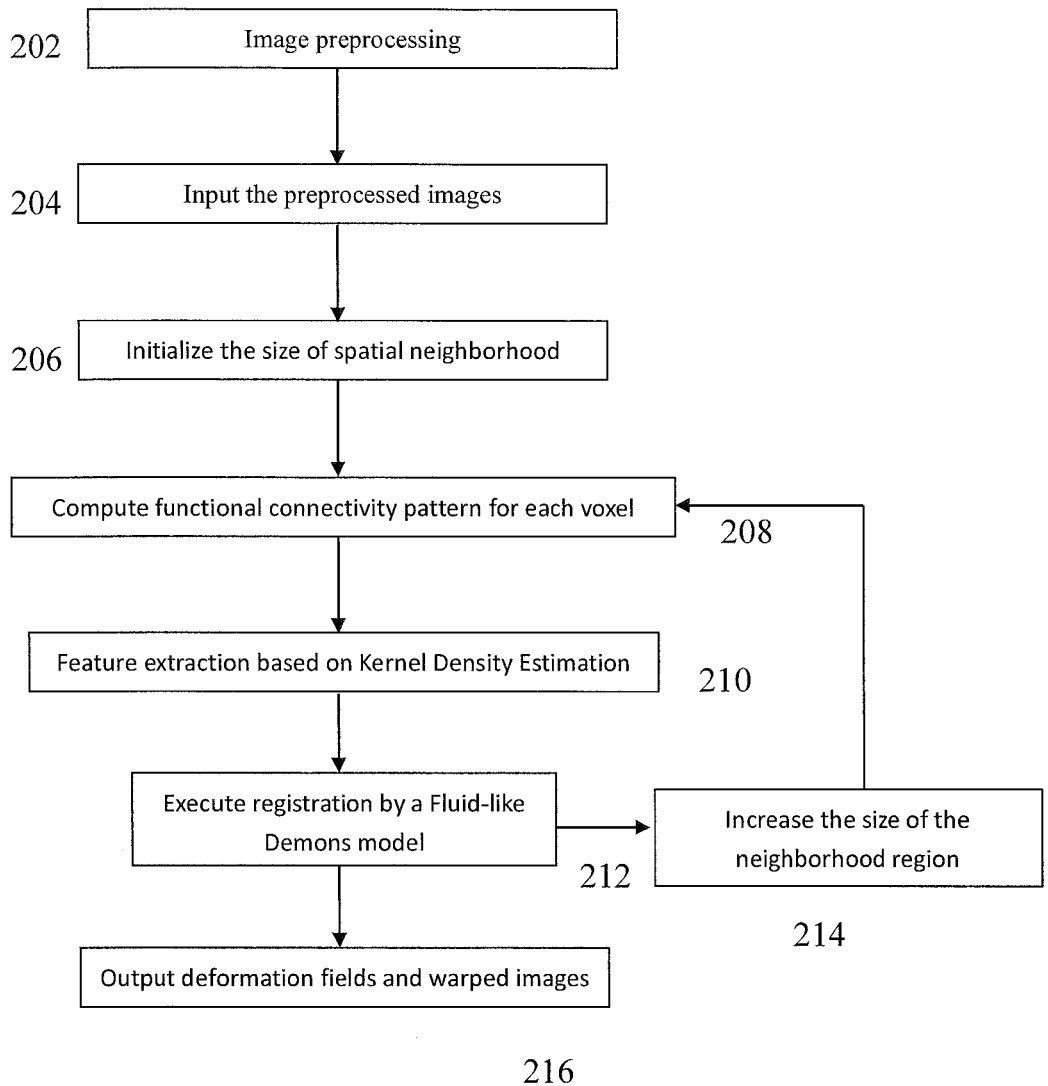
FIG. 2 illustrates the method for registering functional MR images according to an embodiment of the present invention.

FIG. 2 illustrates a flow chart of registering functional MR images according to an embodiment of the present invention.

At step 202, the functional MR images are preprocessed. For each subject, there is a structural MR image and a functional MR image. The preprocessing includes: slice timing, head movement correction, spatial normalization of functional image to structural image, removing the linear drift, band-pass filtering, spatial normalization to 3 mm MNI space based on structure images, and regressing out the nuisance covariants.

At step 204, a pair of functional MR images after preprocessing is set as input of the method, one as moving image while another as target image. The subsequent steps will register the moving image to the target image.

At step 206, the neighborhood size is initiated. The neighborhood can be a cubic (the edge length should be given), a spherical (the radius should be given), or of any other shape.

At step 208, according to the given neighborhood size, for each voxel, compute its Pearson correlations to every neighboring voxels in its spatial neighborhood, generating a set of correlation measures. The Pearson correlation is a commonly used index of functional connectivity which can be computed as following:

$$C(X, Y) = \frac{\text{Cov}(X, Y)}{\sqrt{\text{Var}(X)} * \sqrt{\text{Var}(Y)}}$$

At step 210, features invariant to spatial locations of neighboring voxels are extracted based on the set of correlation measures generated in step 208. In particular, the set of correlation measures are modeled as sampling points of a specific probability distribution, hence the distribution can be estimated by Kernel Density Estimation technique based on the sampling points as following:

$$f_h(x) = \frac{1}{nh} \sum_{i=1}^{n} K\left(\frac{x - x_i}{h}\right),$$

where n is the sample number, $x_i$ is one sample point, x is the point at which the density is estimated, K(.) is some kernel function such as Gaussian, h is bandwidth of the kernel function, $f_h(x)$ is the estimated probability density at x. The probability distribution is used as feature in the subsequent registration, and it does not depend on the spatial locations of neighboring voxels so that this feature representation is invariant to the neighbors' locations.

At step 212, the similarity measure between the moving and target images is constructed based on the feature extracted in step 210 to construct the objective function. Assuming that the sample number is D when estimating the probability distribution in step 210, hence the feature of each voxel is a D-dimensional vector in the D-dimensional Euclidian space, thus Euclidian distance can be estimated as similarity measure between corresponding voxels of two images. Other metrics which measure the similarity between probability distribution can also be used here. The distance is getting smaller when the features of corresponding voxels of moving and target images becoming more consistent. Based on this similarity metric, the objective function can be constructed and deformation field g can be solved by optimizing the objective function. When minimizing the objective function, the deformation fields need to be regularized to prevent severe spatial distortions. Fluid-like Demons is a registration model that simulates the fluid motion, and is adopted here. The presented optimization strategy is briefly summarized as following:

1) Computing the velocity field v;
2) Fluid-like smooth the velocity field v by Gaussian kernel:

$$v = v * K_{Gauss}$$

3) Update the deformation field: u=u+v, where u is the deformation field, $K_{Gauss}$ is the Gaussian kernel.

At step 214, the neighborhood size is increased. According to step 206, the edge length of cubic neighborhood, or the radius of spherical neighborhood is increased, and then repeat the step 208, 210, 212 until convergence. By doing this, the functional connectivity patterns at larger spatial ranges can be gradually captured and used in the registration, thus achieving the goal of registration using multi-range functional connectivity patterns.

At step 216, output the optimal deformation fields and the warped functional MR images.

Figure 3A:
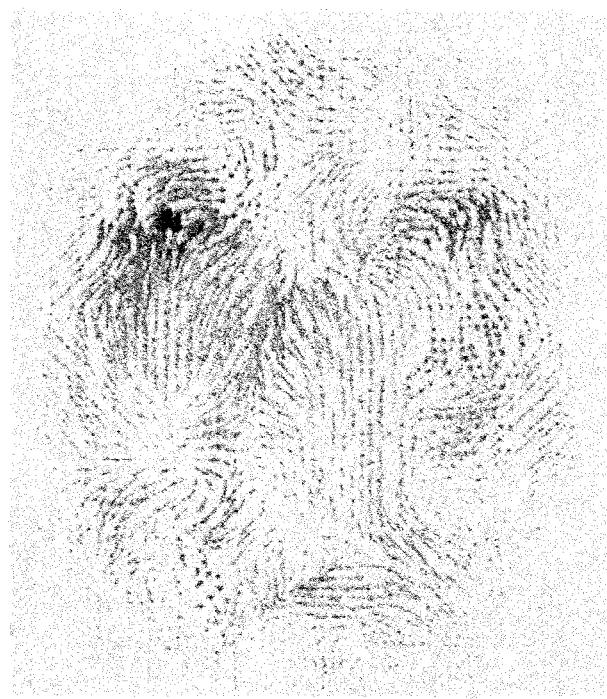
FIGS. 3A-3C illustrate the inter-subject functionality consistency comparison results.
Figure 3A:
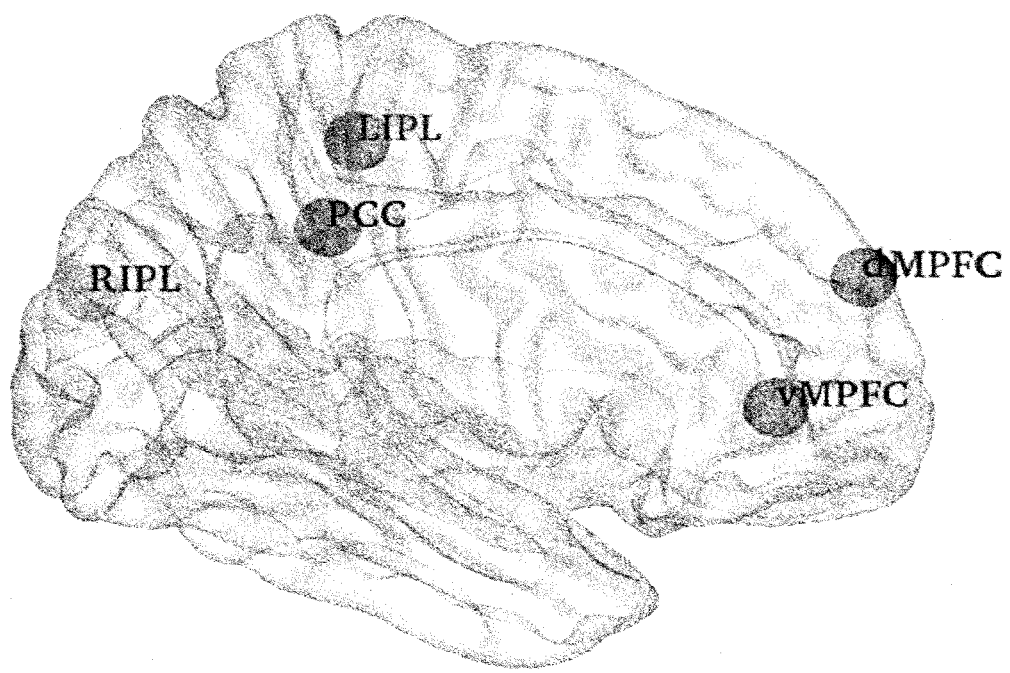
Figure 3B:
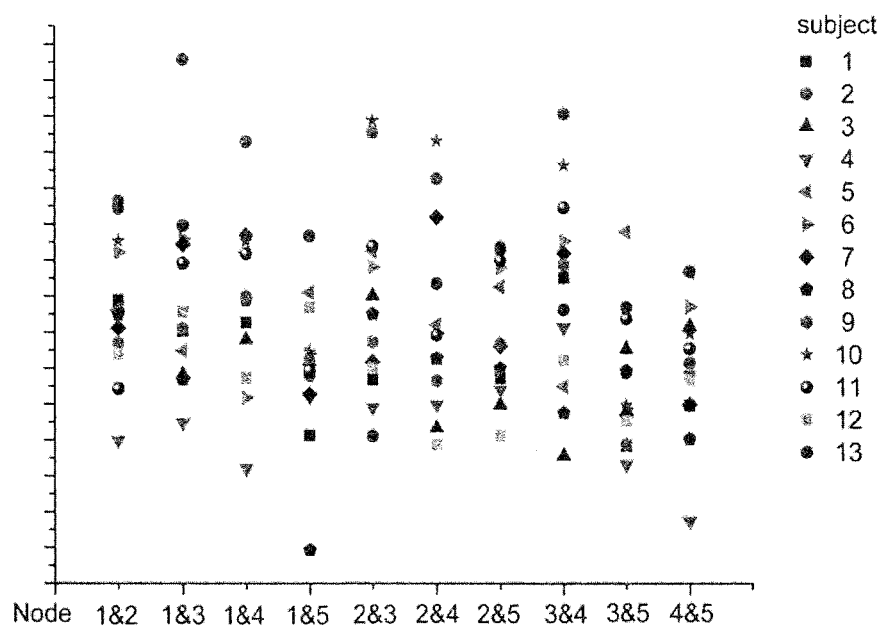
Figure 3B:
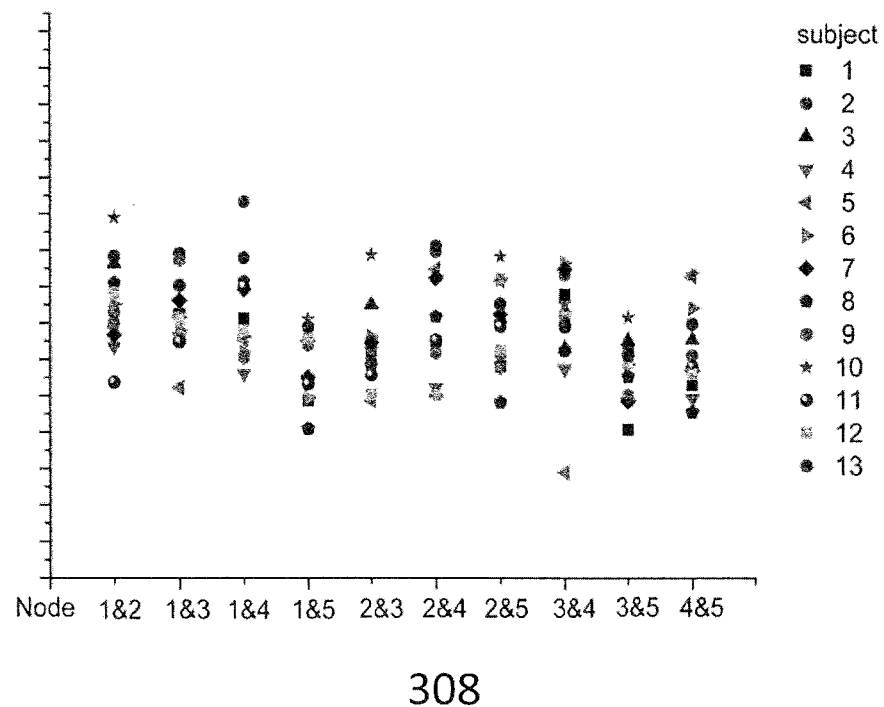
Figure 3C:
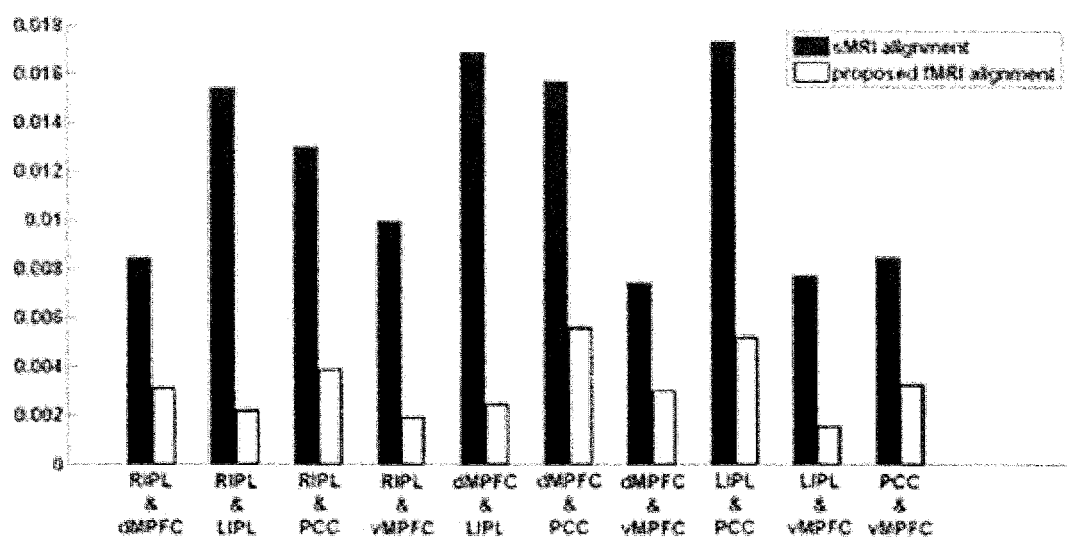

FIGS. 3A-3C illustrate a deformation field generated by this method and the comparison results of inter-subject functional consistency before (only registered based on structural MR images) and after (sMRI based+fMRI based registration) performing the presented method. As illustrated in FIGS. 3A-3C, FIG. 302 schematically shows a deformation field result generated by this method. FIG. 304 shows the 5 hub nodes of Default Mode Network (DMN). The functional consistency across different subjects can be evaluated by assessing their inter-subject consistency of functional connectivity between each pair of these 5 nodes. FIG. 306 shows the functional connectivities between each pair of these 5 nodes computed in a group of subjects before fMRI registration. FIG. 308 shows these functional connectivities computed in the same group of subjects after fMRI registration. It is obvious that the variance become much lower after performing the presented method. FIG. 310 shows comparison of the variances of node-to-node functional connectivities among these subjects, particularly, blue bars are variances before fMRI registration and red bars are those after fMRI registration. It is obvious that the variance become much lower after performing the presented method, indicating that the presented method can achieve the goal of improving the inter-subject functional consistency.

Rather than performing functional MR image registration within the existing frameworks, the described automatic method utilizes multi-range functional connectivity patterns to guide the registration. The key elements of the method are: 1) Functional connectivity patterns used in the registration is computed at small spatial range initially and gradually increased to of large spatial range; 2) Features invariant to spatial locations of neighboring voxels are extracted based on the functional connectivity patterns.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. A method for registering functional MRI data, comprising:
   computing a functional connectivity pattern for each voxel of fMRI images to be registered, each voxel's functional connectivity pattern comprising a set of functional connectivity measures between the voxel itself and its neighboring voxels in its given local spatial neighborhood with a given spatial size;
   extracting features invariant to spatial locations of the neighboring voxels based on the functional connectivity patterns;
   calculating a similarity metric between corresponding voxels of the fMRI images based on the extracted features, and executing spatial registration on the fMRI images by using a fluid-like demons registration model.

2. The method of claim 1, wherein the given local spatial neighborhood is a cubic region or a spherical region.

3. The method of claim 2, wherein computing a functional connectivity pattern comprises:
   gradually increasing the size of the local spatial neighborhood to obtain the functional connectivity pattern in the given spatial neighborhood until the algorithm converges.

4. The method of claim 3, wherein gradually increasing the size of the local spatial neighborhood comprises:
   increasing a side length when the local spatial neighborhood is a cubic neighborhood; or
   increasing a radius when the local spatial neighborhood is a spherical neighborhood.

5. The method of claim 1, wherein extracting features invariant to spatial locations of the neighboring voxels comprises:
   modeling a set of functional connectivity measures as sampling points of a certain probability distribution estimated by a Kernel Density Estimation method; and
   using the probability distribution as the features invariant to spatial locations of the neighboring voxels.

6. The method of claim 1, wherein calculating a similarity metric between corresponding voxels of the fMRI images comprises:
   modeling features in an Euclidian space; and
   using an Euclidian distance as the similarity metric between the corresponding voxels of fMRI images.

7. The method of claim 1, wherein using a fluid-like demons registration model comprises:
   computing a velocity field v;
   executing a fluid-like smooth on the velocity field v by a Gaussian kernel:

$$v = v * K_{Gauss};\text{ and}$$

updating a deformation field: u=u+v, where u is the deformation field, $K_{Gauss}$ is the Gaussian kernel.

8. The method of claim 1, wherein the similarity metric is either linear or non-linear.

* * * * *